US011956164B2

United States Patent
Khan et al.

(10) Patent No.: US 11,956,164 B2
(45) Date of Patent: Apr. 9, 2024

(54) REMOTE MANAGEMENT OF A SWITCH STACK

(71) Applicant: Hewlett Packard Enterprise Development LP, Houston, TX (US)

(72) Inventors: Aslam Khan, Santa Clara, CA (US); Khiruthigai Balasubramanian, Santa Clara, CA (US); Suhas Kumar Bharadwaj, Bangalore Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/661,482

(22) Filed: Apr. 29, 2022

(65) Prior Publication Data
US 2023/0353506 A1 Nov. 2, 2023

(51) Int. Cl.
*H04L 49/111* (2022.01)
*H04L 49/112* (2022.01)
*H04L 49/20* (2022.01)
*H04L 49/354* (2022.01)
*H04L 49/65* (2022.01)

(52) U.S. Cl.
CPC .......... *H04L 49/111* (2022.05); *H04L 49/112* (2022.05); *H04L 49/208* (2013.01); *H04L 49/354* (2013.01); *H04L 49/65* (2013.01)

(58) Field of Classification Search
CPC ................................................... H04L 49/111
See application file for complete search history.

(56) References Cited

U.S. PATENT DOCUMENTS

| 7,032,014 B2 | 4/2006 | Thiyagarajan et al. |
| 7,712,137 B2 | 5/2010 | Meier |
| 9,898,344 B2 | 2/2018 | Kalali |
| 9,912,544 B2 * | 3/2018 | Gopalarathnam ...... H04L 41/30 |
| 9,917,736 B2 | 3/2018 | Jubran et al. |
| 10,114,861 B2 | 10/2018 | Poon et al. |
| 10,616,339 B2 * | 4/2020 | Nagalla ............... H04L 67/1097 |
| 10,684,893 B2 * | 6/2020 | Siddappa ............ G06F 9/45558 |
| 10,733,088 B1 * | 8/2020 | Sommers ............ G06F 11/3688 |
| 10,764,147 B1 * | 9/2020 | Ireland ..................... H04L 45/06 |
| 10,831,251 B1 * | 11/2020 | Ross ......................... G06F 1/30 |
| 10,841,226 B2 | 11/2020 | Mariappan et al. |
| 10,917,339 B2 | 2/2021 | Pianigiani et al. |
| 11,070,431 B2 | 7/2021 | Krivenok |
| 11,374,880 B2 * | 6/2022 | Lochhead ............... H04L 45/42 |

(Continued)

FOREIGN PATENT DOCUMENTS

WO    2016/053665 A1    4/2016

*Primary Examiner* — Guang W Li
(74) *Attorney, Agent, or Firm* — Slater Matsil, LLP (57) ABSTRACT

An example network manager receives, from a conductor switch of a switch stack, an active configuration. The network manager determines, based on the active configuration, switch model types for a plurality of switches of the switch stack. The network manager determines, based on the switch model types and the active configuration, a number of ports of the plurality of switches of the switch stack and a current configuration of each port of each switch of the switch stack. The network manager updates a device configuration element of a network management user interface to display the current configuration of each port of each switch of the switch stack in a manner that indicates that the switch stack is a single logical switch.

20 Claims, 4 Drawing Sheets

(56) References Cited

U.S. PATENT DOCUMENTS

| | | | |
|---|---|---|---|
| 11,632,360 B1* | 4/2023 | Tan | G06F 3/0622 |
| | | | 726/4 |
| 2008/0275975 A1* | 11/2008 | Pandey | H04L 49/65 |
| | | | 709/250 |
| 2013/0073711 A1* | 3/2013 | Hanka | H04L 49/552 |
| | | | 709/223 |
| 2015/0046572 A1* | 2/2015 | Cheng | H04L 12/4641 |
| | | | 709/220 |
| 2015/0100704 A1* | 4/2015 | Davie | H04L 12/46 |
| | | | 709/238 |
| 2015/0220327 A1 | 8/2015 | Poon et al. | |
| 2016/0226762 A1* | 8/2016 | Zhang | H04L 12/4654 |
| 2016/0277214 A1* | 9/2016 | Guntaka | H04L 45/745 |
| 2016/0277318 A1* | 9/2016 | Guntaka | H04L 41/0813 |
| 2017/0155599 A1* | 6/2017 | Vobbilisetty | H04L 49/70 |
| 2017/0212784 A1* | 7/2017 | Johnsen | H04L 41/0806 |
| 2020/0204405 A1* | 6/2020 | Du | H04L 49/25 |
| 2023/0082398 A1* | 3/2023 | Kaushik | H04L 49/253 |
| | | | 370/392 |
| 2023/0161631 A1* | 5/2023 | Sharma | G06F 9/4856 |
| | | | 718/104 |
| 2023/0315437 A1* | 10/2023 | Kumar | G06F 8/656 |
| | | | 717/170 |
| 2023/0353506 A1* | 11/2023 | Khan | H04L 49/354 |

\* cited by examiner

REMOTE MANAGEMENT OF A SWITCH
STACK

BACKGROUND

High capacity network switches are often quite expensive. For network architects with limited resources, the high capacity network switches may not be feasible within their budget, which can impact network design, scale and functionality. One alternative technique is to connect multiple lower capacity network switches together into a switch stack. The switch stack is configured as a single logical switch, even though multiple physical switches are part of the switch stack. Often, the combined cost of the lower capacity switches of the switch stack is still lower than the cost of buying an equivalent high capacity network switch.

BRIEF DESCRIPTION OF THE DRAWINGS

For a more complete understanding of the present disclosure, examples in accordance with the various features described herein may be more readily understood with reference to the following detailed description taken in conjunction with the accompanying drawings, where like reference numerals designate like structural elements, and in which.

DETAILED DESCRIPTION

While switch stacks are a more economical alternative to high-capacity switches, network administrators are often hampered with a large amount of manual configuration of the network to enable a switch stack to replace a high-capacity switch. This manual effort runs contrary to the general industry trend towards increased automation and remote network management. However, automation and remote management are hampered by limited access to the physical switches of the switch stack. Not all physical switches of the switch stack are required to have a functional uplink to the wide area network (e.g. Internet), making it difficult to retrieve configuration data from those switches using a remote network management system (also known as a network manager or network orchestrator).

Remote network management systems, such as cloud-based network managers, generally do not have management access to the physical switches of the switch stack to determine configuration of each switch of the switch stack. For example, the network manager cannot query each physical switch of the switch stack to determine how many ports each physical switch has. As a result, the switch stack cannot be represented properly in the remote network management system without substantial manual intervention. Switch stacks are configured with a conductor switch, which communicates to the network manager In an example consistent with this disclosure, a network administrator configures a switch stack using a network management user interface. The network management user interface provides the network administrator device configuration elements, such as web forms, to configure features of the network devices, including the switch stack. Configurable features may be configured on a per-switch or a per-port basis. Prior to displaying a web form for configuring features of the switch stack, the network management user interface receives information about the switch stack from a backend service running on the network manager. The backend service transmits configuration information to the network management user interface by sending structured data, such as by sending javascript object notation (JSON) data to a REST API of the network management user interface. The backend service generates the structured data based on an active configuration received from the conductor switch of the switch stack. The active configuration includes, among other information, model types for the physical switches of the switch stack, and port configurations (such as speed, virtual local area network (VLAN) mode, VLAN number, etc.) of ports of the switch stack.

In this example, the backend service uses the model type for each physical switch (from the active configuration) to build the structured data for the switch stack, including the number of ports of the switch stack and configurations for each port. The backend service selects a respective switch configuration file from a switch library for each physical switch of the switch stack, based on the model type of the switch. From the switch configuration files, the backend service builds the structured data for the switch stack, which is applied as a template by the network management user interface. The network administrator, when accessing one of the web forms for configuring the switch stack, is presented with current configuration information for each physical switch of the switch stack as a single logical switch. The network administrator is also constrained by the user interface to only make configuration changes that are physically possible with the particular combination of physical switches present in the switch stack.

In some examples, if the conductor switch of the switch stack fails, the switch stack fails over to a backup conductor switch. The network manager receives an active configuration from the backup conductor switch and migrates the configuration information for the switch stack to the backup conductor switch rather than generating new configuration files and structured data.

Figure 1:
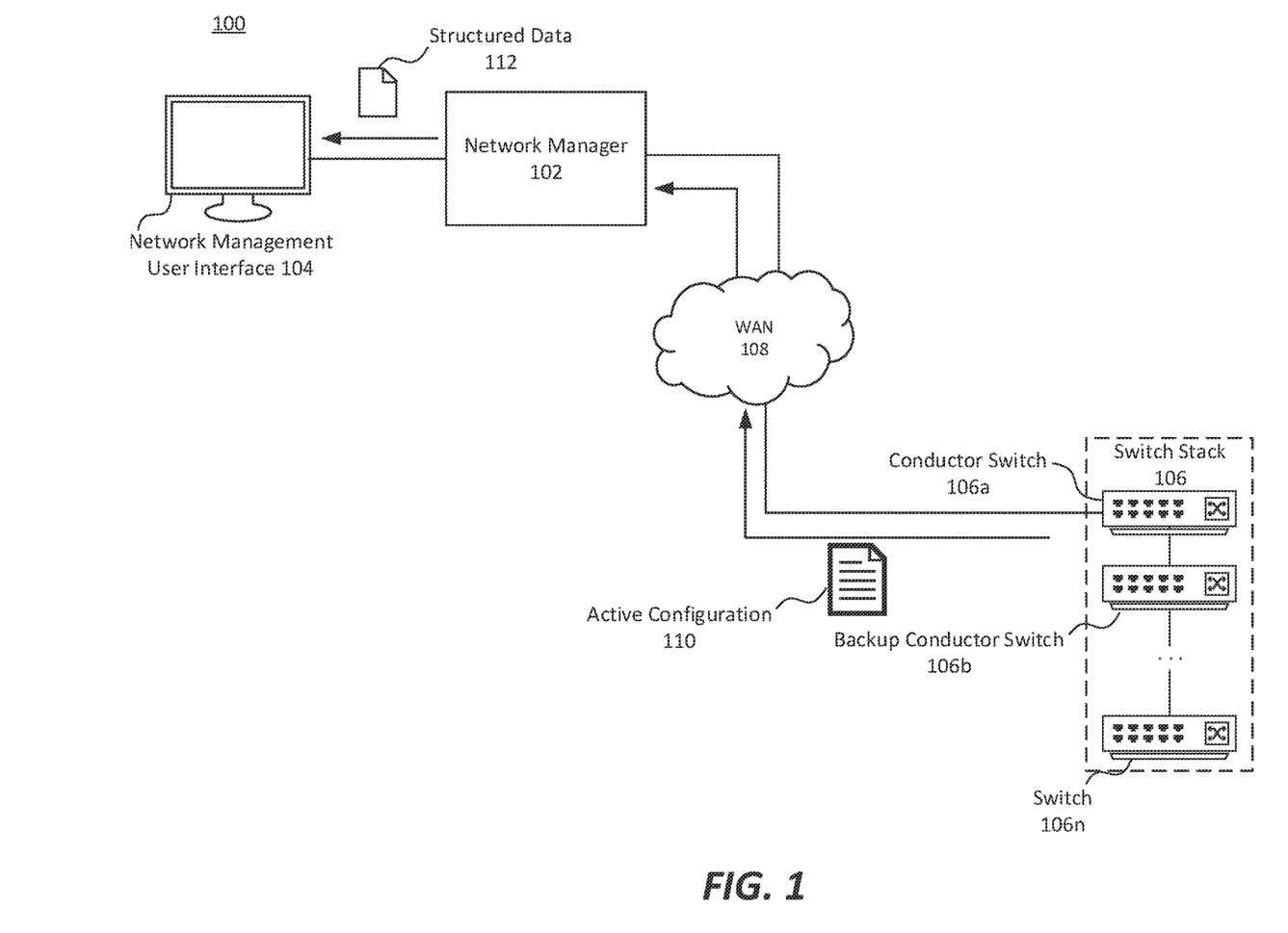
FIG. 1 illustrates an example network including a network manager.

FIG. 1 illustrates an example network 100 including a network manager 102. Network 100 includes a network manager 102 with a network management user interface 104. Network manager 102 is coupled to switch stack 106 via WAN 108. Network 100 may be a corporate network, university network, campus network, multi-site network or any other centrally managed network. Network 100 may include a variety of wired and wireless technologies, may incorporate multiple administrative domains, and may be configured in a variety of different ways. As is apparent to a person having ordinary skill in the art, the particulars of network 100 do not impact the teachings of this disclosure.

Network manager 102 provides a single point of configuration for network 100. For example, network 100 may include multiple local area networks (LANs) (not shown), and network manager 102 may enable a network administrator to monitor, troubleshoot, and configure devices in all of the LANs of network 100 from a single interface. This is sometimes called "single pane of glass", "cloud-based network management", or "remote network management". Network manager 102 may be a hardware device including memory and processing circuitry deployed in a site of network 100, a cloud-based device deployed in a public or private cloud, or a collection of physical devices deployed in an as-a-service or subscription configuration. The particular configuration and deployment model of network manager 102 does not impact the teachings of this disclosure. Network manager 102 provides network management user interface 104. Network management user interface 104 may take one of many forms, depending on the particulars of network manager 102, but a common form is a cloud hosted website that is accessible by the network administrator. Network management user interface 104 provides status information about network devices of network 100, including switch stack 106. Network management user interface 104 also provides device configuration elements for the network devices of network 100, including switch stack 106. Network management user interface 104 may provide any number of device configuration elements, depending on the number of configurable elements of the network devices, enabled features of network 100, and configuration permissions granted to the particular network administrator. A device configuration element may take many forms, including a web form, a web input element, a graphical user interface input element, a console command, etc. The particular form of the device configuration element does not impact the teachings of this disclosure.

Switch stack 106 is a logically connected set of physical switches 106a-n of network 100. Switch stack 106 may act as a single logical switch when viewed by other network devices of network 100. For example, not all physical switches 106a-n may have active uplink connections to WAN 108. Further, switch stack 106 is managed by network manager 102 via a connection between a conductor switch 106a of the switch stack 106, rather than via individual connections between network manager 102 and each physical switch 106a-n of switch stack 106. Switch stack 106 is initially configured physically and logically on each physical switch 106a-n so that each physical switch is aware that it is part of switch stack 106. A conductor switch 106a is also selected during the initial configuration. In some examples, the network administrator directly configures physical switches 106a-n to form switch stack 106 and separately provisions switch stack 106 in network manager 102 as a single logical switch. However, provisioning switch stack 106 cannot be done in the same manner as provisioning a single physical switch. As mentioned above, network manager 102 may not have active uplink connections to each physical switch 106a-n of switch stack 106. Even in situations where active uplink connections exist, the physical switches 106a-n are configured to act as a single logical switch and may not provide needed information to network manager 102.

Since network manager 102 and switch stack 106 are separated by WAN 108, communication between them may be limited by bandwidth and security constraints, among other concerns. WAN 108 may include private links (e.g. MPLS), but WAN 108 may also include public internet links that are not owned, controlled, or managed by the owner of network 100. This is particularly likely when network manager 102 is cloud-based or provided as-a-service.

Conductor Switch 106a transmits active configuration 110 to network manager 102 via WAN 108. In situations where a single physical switch (not a switch stack) is provisioned with network manager 102, the single physical switch may also transmit an active configuration to network manager 102. The active configuration includes, among other information, a model type of the switch. Network manager 102 may then reference static configuration files stored in a switch library. The switch library may include a static configuration file for each model type that network manager 102 is able to manage. The static configuration file associated with the single physical switch includes information such as number of ports, default port configurations, and default switch configurations for that model of switch.

When conductor switch 106a of switch stack 106 transmits active configuration 110 to network manager 102, active configuration 110 includes model information for physical switches 106a-n. Based on active configuration 110, network manager 102 determines switch model types for each of the physical switches 106a-n. Network manager 102 then references static configuration files for each of the physical switches 106a-n based on their respective switch model types to gather information about switch stack 106. For example, network manager 102 may determine a number of ports of the switch stack based on the number of ports of each physical switch of the switch stack. Network manager 102 may also determine default configurations for each of the ports of switch stack 106 based on default port configurations from the static configuration files associated with switches 106a-n. Network manager 102 may then build a dynamic configuration file for switch stack 106 based on the static configuration files associated with switches 106a-n. Network manager 102 may then compare the default port configurations from the dynamic configuration file to current port configurations transmitted from the conductor switch 106a in active configuration 110 to determine a current configuration and to determine which configurations have changed in switch stack 106. In some examples, the current configuration is cached for comparison with a future active configuration received from conductor switch 106a when additional configuration changes are made. Network manager 102 also generates structured data 112 describing the current configuration and characteristics of switch stack 106 and transmits structured data 112 to network management user interface 104. This structured data 112 may, for example, be transmitted to network management user interface 104 using a REST API. The structured data 112 may be formatted as javascript object notation (JSON) data. In some examples, structured data 112 indicates to network management user interface 104 a single logical switch (corresponding to switch stack 106). In some examples, structured data 112 represents a template or a schema that provides configurable parameters for switch stack 106 and constrains and validates inputs into network management user interface 104 to allow configurability only insofar as the equipment is capable. While FIG. 1 illustrates network manager 102 being separate from network management user interface 104, this configuration is not necessary. As can be appreciated by a person having ordinary skill in the art, a network management user interface can be implemented in many ways, including as a component of network manager 102, as instructions executing on the same physical device as network manager 102, as a web form delivered by a web server to a client device of the network administrator, as a graphical user interface (GUI) on a device, and others. The particular implementation of network management user interface 104 does not impact the teachings of this disclosure so long as network manager 102 transmits structured data 112 to network management user interface 104.

The network administrator can configure switch stack 106 via network management user interface 104, and the configuration changes can be forwarded back to switch stack 106 by network manager 102. Network manager 102 may retain the configuration changes in the cached current configuration and forward the configuration changes to switch stack 106. The network management user interface 104 may provide a device configuration element to the network administrator that includes the correct number and configuration of ports as are present on switch stack 106.

If conductor switch 106a experiences a failure (including the link between conductor switch 106a and network manager 102 failing, and the links between conductor switch 106a and switches 106b-n failing), network manager 102 loses the sole conduit for communication with switch stack 106. However, switch stack 106 may fail over to a backup conductor switch 106b. In some examples, backup conductor switch 106b has an uplink to WAN 108 that is kept in standby mode until failover. In some other examples, backup conductor switch 106b has an uplink to WAN 108 that is active even when conductor switch 106a is operational, but backup conductor switch 106b is not connected to network manager 102. In yet other examples, backup conductor switch 106b has an uplink to WAN 108 that is active even when conductor switch 106a is operational, and backup conductor switch 106b is connected to network manager 102, but the connection is inactive while conductor switch 106a is operational.

Upon failover, rather than building a new dynamic configuration file and setting up a new logical switch for the switch stack since a new active configuration 110 is received from a different conductor switch 106b, network manager 102 detects that switch stack 106 has failed over, and that the parameters of switch stack 106 still apply except for the change of conductor from conductor switch 106a to backup conductor switch 106b, and any port configuration and status changes resulting from the failure of conductor switch 106a. Network manager 102, upon detecting the failover, preserves and migrates the configuration information of switch stack 106 to backup conductor switch 106b. Network manager 102 may, for example, detect the failover by comparing an identifier of backup conductor switch 106b to a backup conductor identifier presented in active configuration 110 sent by conductor switch 106a prior to failure.

Figure 2:
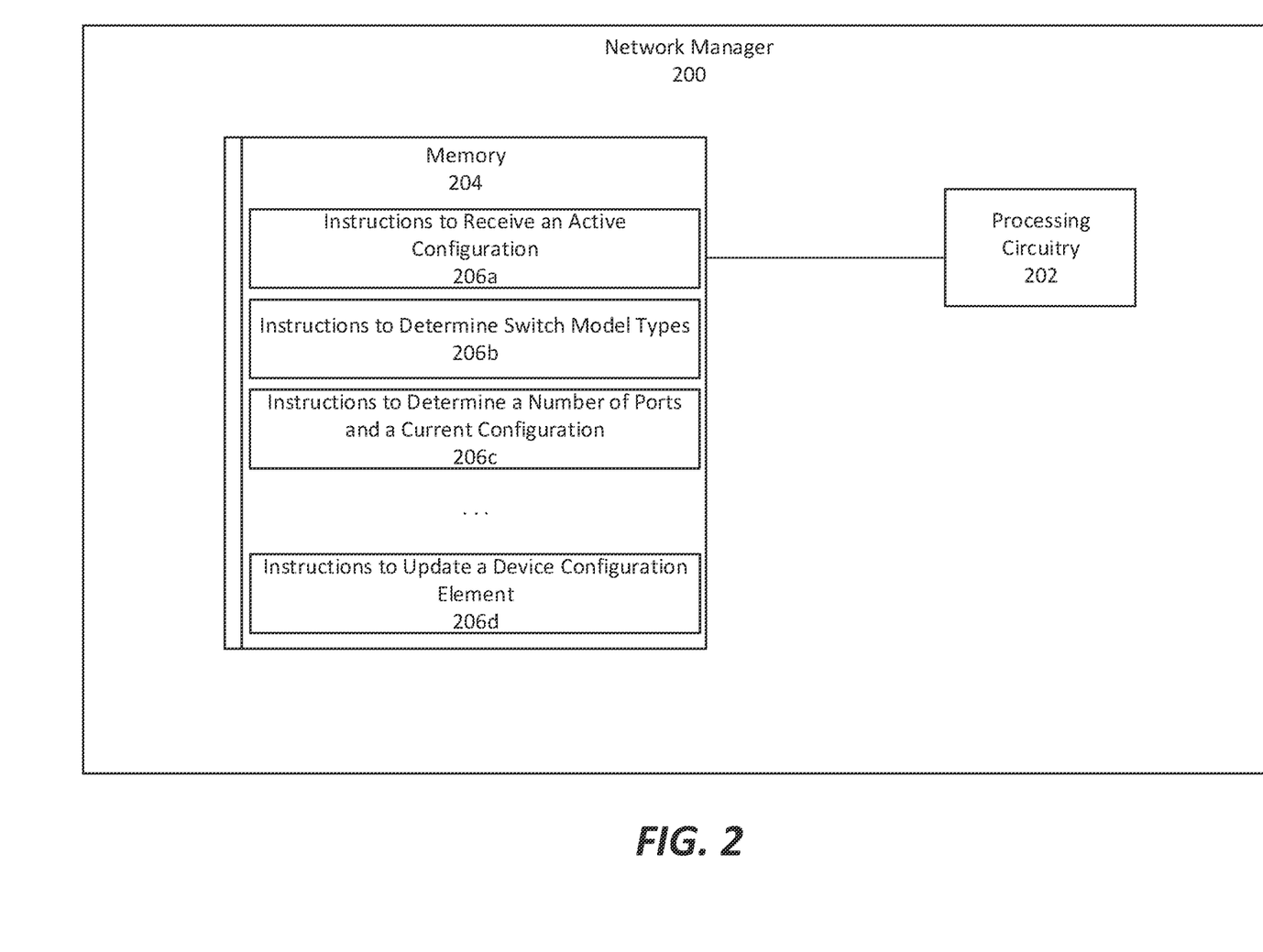
FIG. 2 illustrates an example network manager.

FIG. 2 illustrates an example network manager 200. Network manager 200 provides a single point of configuration for a network. For example, the network may include multiple local area networks (LANs), and network manager 200 may enable a network administrator to monitor, troubleshoot, and configure devices in all of the LANs of the network from a single interface. This is sometimes called "single pane of glass", "cloud-based network management", or "remote network management". Network manager 200 is shown in FIG. 2 as a hardware device including memory and processing circuitry deployed in a site of network or a cloud-based device deployed in a public or private cloud, but network manager 200 may reside on a collection of physical devices or be deployed in an as-a-service or subscription configuration. The particular configuration and deployment model of network manager 200 does not impact the teachings of this disclosure. Network manager 200 provides a network management user interface. The network management user interface may take one of many forms, depending on the particulars of network manager 200, but a common form is a cloud hosted website that is accessible by the network administrator. The network management user interface provides status information about network devices, including a switch stack. The network management user interface also provides device configuration elements for the network devices, including the switch stack. The network management user interface may provide any number of device configuration elements, depending on the number of configurable elements of the network devices, enabled features of the network, and configuration permissions granted to the particular network administrator. A device configuration element may take many forms, including a web form, a web input element, a graphical user interface input element, a console command, etc. The particular form of the device configuration element does not impact the teachings of this disclosure.

Network manager 200 includes processing circuitry 202 and memory 204. Processing circuitry 202 receives instructions 206 from memory 204 and executes them to cause network manager 200 to undertake certain actions. Memory 204 stores instructions 206 and data (not shown) and serves them to processing circuitry 202. Memory 204 is a non-transitory, computer readable medium. Each of instructions 206a-d may represent any number of instructions stored in memory 204. Additional instructions (represented by the ellipses between instructions 206c and instructions 206d) may be stored in memory 204 that enable execution of additional features of this disclosure.

In instructions 206a network manager 200 receives an active configuration from a conductor switch of a switch stack. The switch stack is a single logical switch made from multiple physical switches connected together and configured to act as a single entity. In some examples, the active configuration is sent to network manager 200 upon a request being sent from network manager 200 to the conductor switch of the switch stack. In certain examples, the active configuration is be sent to network manager 200 upon a configuration change occurring on the switch stack. In some examples, the active configuration is sent to network manager 200 periodically. The active configuration includes information about the switch stack, such as model names for each physical switch of the switch stack and port configurations for the ports of the switch stack.

In instructions 206b, network manager 200 determines switch model types for each physical switch of the switch stack, based on the received active configuration. In some examples, network manager 200 references a lookup table (e.g. a hash table) to determine the switch model types from the model names received in the active configuration. Network manager 200 then retrieves corresponding static configuration files from a switch library. The switch library may be a repository of static configuration files for all model types supported by network manager 200. In some other examples, network manager 200 determines the switch model types directly from the model names and retrieve the corresponding static configuration files based on the model names received in the active configuration.

In instructions 206c, network manager 200 determines, based on the switch model types and the active configuration, a number of ports of the switches of the switch stack and a current configuration of each port of each switch of the switch stack. In some examples, network manager 200 reads information from the retrieved static configuration files and determines a number of ports for each switch of the switch stack, along with default port configurations for each port of the switch. The default port configurations may not reflect the port configurations communicated in the active configuration, so network manager 200 may generate and cache a current configuration along with generating and saving a dynamic configuration file. The dynamic configuration file is the switch stack equivalent of the static configuration files in the switch library (and may be likewise saved in the switch library), but dynamically changes as physical switches are added to or removed from the switch stack. The dynamic configuration file, like the static configuration files, provides default configuration information about the switch stack.

In instructions 206d, network manager 200 updates a device configuration element of the network management user interface to display the current configuration of each port of each switch of the switch stack. Network manager 200 updates the device configuration element in a way that indicates that the switch stack is a single logical switch. In some examples, network manager 200 updates the device configuration element by transmitting structured data to the network management user interface using a REST API. In certain examples, the structured data is JavaScript Object Notation (JSON) formatted data. In some examples, the structured data represents a template or a schema that provides configurable parameters for the switch stack and constrains and validates inputs into the network management user interface to allow configurability only insofar as the equipment is capable.

In additional instructions not shown in FIG. 2, network manager 200 may preserve the device configuration element upon the conductor switch experiencing a failure and replace the conductor switch with a backup conductor switch of the switch stack. Upon failover, rather than building a new dynamic configuration file and setting up a new logical switch for the switch stack, network manager 200 detects that the switch stack has failed over to the backup conductor switch, and that the parameters of the switch stack still apply except for the change of conductor from the conductor switch to the backup conductor switch, and any port configuration and status changes resulting from the failure of the conductor switch. Network manager 200, upon detecting the failover, preserves and migrates the configuration information of the switch stack to the backup conductor switch. Network manager 200 may, for example, detect the failover by comparing an identifier of the backup conductor switch to a backup conductor identifier presented in an active configuration sent by conductor switch prior to failure.

Figure 3:
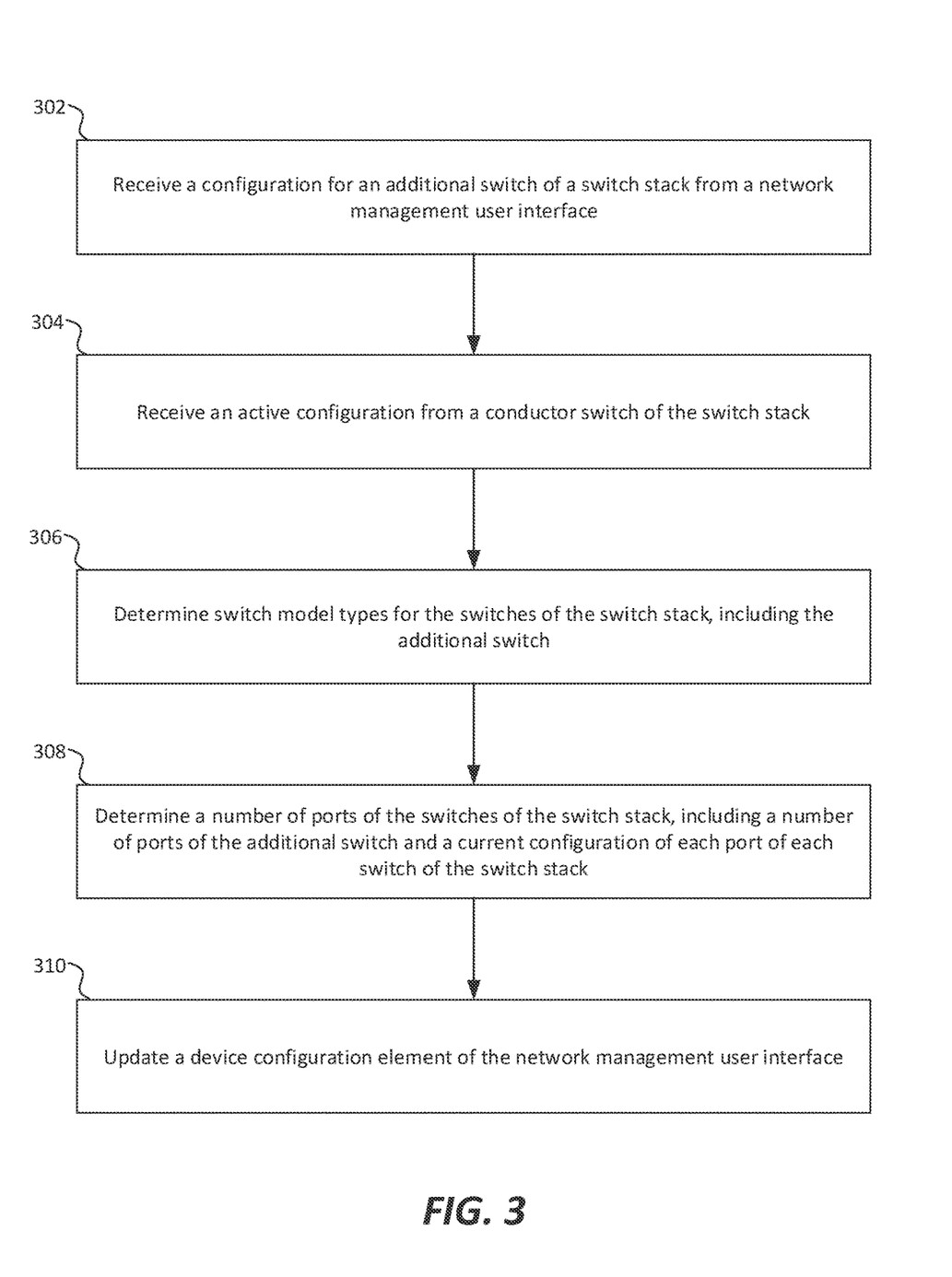
FIG. 3 is a flow chart of an example method for managing a network.

FIG. 3 is a flow chart of an example method 300 for managing a network. Method 300 may be stored as instructions in a non-transitory, computer readable medium and executed on processing circuitry of a device, such as a network manager.

In block 302, a configuration is received from a network management user interface for an additional switch of a switch stack. In some examples, a network administrator may add a switch to the switch stack via the network management user interface by selecting a model type from a list of model types. The mere selection of a model type in the network management user interface does not add another physical switch to the switch stack, but it may expedite the configuration of the additional physical switch once deployed. In some examples, a network manager may update a dynamic configuration file associated with the switch stack and a current configuration of the switch stack that is cached.

In block 304, an active configuration is received from a conductor switch of the switch stack. When the conductor switch of the switch stack transmits the active configuration, the active configuration includes model information for the physical switches of the switch stack, including model information for the additional switch configured in block 302. In some examples, information such as port configurations and switch configurations are included in the active configuration.

In block 306, switch model types are determined for the switches of the switch stack based on the active configuration. In some examples, the network manager references a lookup table (e.g. a hash table) to determine the switch model types from model names received in the active configuration. The network manager then retrieves corresponding static configuration files from a switch library. The switch library may be a repository of static configuration files for all model types supported by the network manager.

In some other examples, the network manager determines the switch model types directly from the model names and retrieve the corresponding static configuration files based on the model names received in the active configuration.

In block 308, a number of ports of the switches of the switch stack and a current configuration of each port of each switch of the switch stack are determined. The number of ports includes a number of ports of the additional switch. In some examples, the network manager reads information from the retrieved static configuration files and determines a number of ports for each switch of the switch stack, along with default port configurations for each port of the switch. The default port configurations may not reflect the port configurations communicated in the active configuration, so network manager may cache a current configuration along with saving a dynamic configuration file. The dynamic configuration file changes as physical switches are added to or removed from the switch stack, including the additional switch. The dynamic configuration file, like the static configuration files, provides default configuration information about the switch stack.

In block 310, a device configuration element of the network management user interface is updated. The device configuration element is to display the current configuration of each port of each switch of the switch stack in a manner that indicates that the switch stack is a single logical switch. In some examples, the network manager also generates structured data describing the current configuration and characteristics of the switch stack and transmits structured data to the network management user interface. This structured data may, for example, be transmitted to the network management user interface using a REST API. The structured data may be formatted as javascript object notation (JSON) data. In some examples, structured data indicates to the network management user interface a single logical switch (corresponding to the switch stack). In some examples, structured data represents a template or a schema that provides configurable parameters for the switch stack and constrains and validates inputs into the network management user interface to allow configurability only insofar as the equipment is capable. The network administrator can configure the switch stack via the network management user interface, and the configuration changes can be forwarded back to the switch stack by the network manager. The network manager may retain the configuration changes in the cached current configuration and forward the configuration changes to the switch stack. The network management user interface may provide a device configuration element to the network administrator that includes the correct number and configuration of ports as are present on the switch stack.

Figure 4:
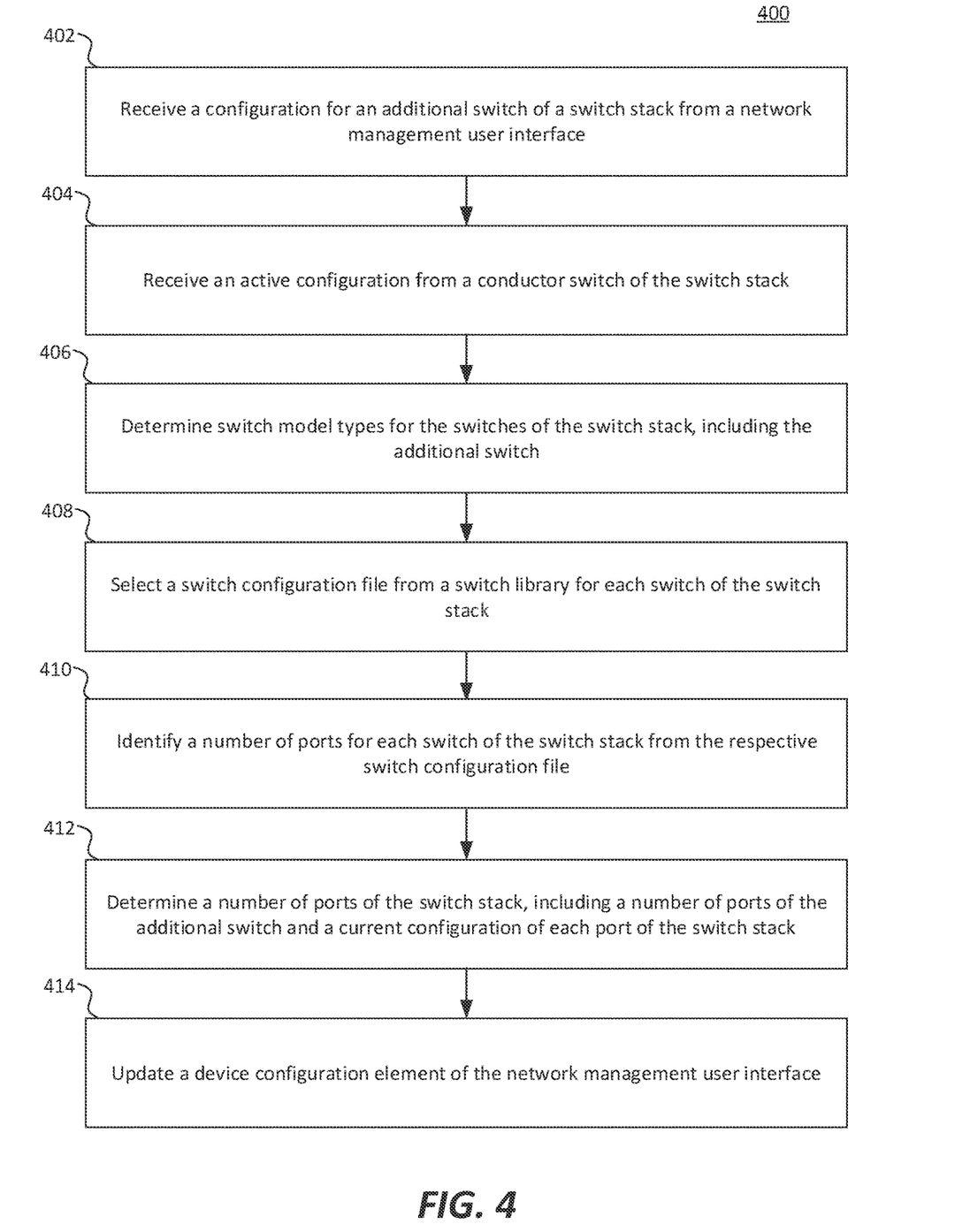
FIG. 4 is a flow chart of another example method for managing a network.

FIG. 4 is a flow chart of an example method 400 for managing a network. Method 400 may be stored as instructions in a non-transitory, computer readable medium and executed on processing circuitry of a device, such as a network manager.

In block 402, a configuration is received from a network management user interface for an additional switch of a switch stack. In some examples, a network administrator may add a switch to the switch stack via the network management user interface by selecting a model type from a list of model types. The mere selection of a model type in the network management user interface does not add another physical switch to the switch stack, but it may expedite the configuration of the additional physical switch once deployed. In some examples, a network manager may update a dynamic configuration file associated with the switch stack and a current configuration of the switch stack that is cached.

In block 404, an active configuration is received from a conductor switch of the switch stack. When the conductor switch of the switch stack transmits the active configuration, the active configuration includes model information for the physical switches of the switch stack, including model information for the additional switch configured in block 402. In some examples, information such as port configurations and switch configurations are included in the active configuration.

In block 406, switch model types are determined for the switches of the switch stack based on the active configuration. In some examples, the network manager references a lookup table (e.g. a hash table) to determine the switch model types from model names received in the active configuration.

In block 408, a switch configuration file is selected from a switch library for each switch of the switch stack. The network manager retrieves static configuration files corresponding to the switch model types from a switch library. The switch library may be a repository of static configuration files for all model types supported by the network manager. In some other examples, the network manager determines the switch model types directly from the model names and retrieve the corresponding static configuration files based on the model names received in the active configuration.

In block 410, a number of ports of each switch of the switch stack is determined. The number of ports includes a number of ports of the additional switch. In some examples, the network manager reads information from the retrieved static configuration files and determines a number of ports for each switch of the switch stack, along with default port configurations for each port of the switch.

In block 412, a number of ports of the switch stack is determined, including a number of ports of the additional switch and a current configuration of each port of the switch stack. The default port configurations from the static configuration files may not reflect the port configurations communicated in the active configuration, so network manager may cache a current configuration along with saving a dynamic configuration file. The dynamic configuration file changes as physical switches are added to or removed from the switch stack, including the additional switch. The dynamic configuration file, like the static configuration files, provides default configuration information about the switch stack.

In block 414, a device configuration element of the network management user interface is updated. The device configuration element is to display the current configuration of each port of each switch of the switch stack in a manner that indicates that the switch stack is a single logical switch. In some examples, the network manager also generates structured data describing the current configuration and characteristics of the switch stack and transmits structured data to the network management user interface. This structured data may, for example, be transmitted to the network management user interface using a REST API. The structured data may be formatted as javascript object notation (JSON) data. In some examples, structured data indicates to the network management user interface a single logical switch (corresponding to the switch stack). In some examples, structured data represents a template or a schema that provides configurable parameters for the switch stack and constrains and validates inputs into the network management user interface to allow configurability only insofar as the equipment is capable. The network administrator can configure the switch stack via the network management user interface, and the configuration changes can be forwarded back to the switch stack by the network manager. The network manager may retain the configuration changes in the cached current configuration and forward the configuration changes to the switch stack. The network management user interface may provide a device configuration element to the network administrator that includes the correct number and configuration of ports as are present on the switch stack. A network administrator is a person, network service, or combination thereof that has administrative access to network devices and configures devices to conform to a network topology.

A client device is a computing device that is operated or accessed by a network user or administrator. Client devices include laptop/desktop computers, tablets/phones/PDAs, servers, Internet of Things devices, sensors, etc.

A network device is a device that receives network traffic and forwards the network traffic to a destination. Network devices may include, among other devices, controllers, access points, switches, routers, bridges, and gateways. Certain network devices may be SDN capable, and thus can receive network commands from a controller, a network manager, or an orchestrator and adjust operation based on the received network commands. Some network devices execute packets services, such as application classification and deep packet inspection, on certain network traffic that is received at the network device. Some network devices monitor load parameters for various physical and logical resources of the network device, and report load information to a controller or a network manager or an orchestrator.

Processing circuitry is circuitry that receives instructions and data and executes the instructions. Processing circuitry may include application specific integrated circuits (ASICs), field programmable gate arrays (FPGAs), microcontrollers (uCs), central processing units (CPUs), graphics processing units (GPUs), microprocessors, or any other appropriate circuitry capable of receiving instructions and data and executing the instructions. Processing circuitry may include one processor or multiple processors. Processing circuitry may include caches. Processing circuitry may interface with other components of a device, including memory, network interfaces, peripheral devices, supporting circuitry, data buses, or any other appropriate component. Processors of a processing circuitry may communicate to one another through shared cache, interprocessor communication, or any other appropriate technology.

Memory is one or more non-transitory computer-readable medium capable of storing instructions and data. Memory may include random access memory (RAM), read only memory (ROM), processor cache, removable media (e.g. CD-ROM, USB Flash Drive), storage drives (e.g. hard drive (HDD), solid state drive (SSD)), network storage (e.g. network attached storage (NAS)), and/or cloud storage. In this disclosure, unless otherwise specified, all references to memory, and to instructions and data stored in memory, can refer to instructions and data stored in any non-transitory computer-readable medium capable of storing instructions and data or any combination of such non-transitory computer-readable media.

The features of the present disclosure can be implemented using a variety of specific devices that contain a variety of different technologies and characteristics. As an example, features that include instructions to be executed by processing circuitry may store the instructions in a cache of the processing circuitry, in random access memory (RAM), in hard drive, in a removable drive (e.g. CD-ROM), in a field programmable gate array (FPGA), in read only memory (ROM), or in any other non-transitory, computer-readable medium, as is appropriate to the specific device and the specific example implementation. As would be clear to a person having ordinary skill in the art, the features of the present disclosure are not altered by the technology, whether known or as yet unknown, and the characteristics of specific devices the features are implemented on. Any modifications or alterations that would be required to implement the features of the present disclosure on a specific device or in a specific example would be obvious to a person having ordinary skill in the relevant art.

Although the present disclosure has been described in detail, it should be understood that various changes, substitutions and alterations can be made without departing from the spirit and scope of the disclosure. Any use of the words "may" or "can" in respect to features of the disclosure indicates that certain examples include the feature and certain other examples do not include the feature, as is appropriate given the context. Any use of the words "or" and "and" in respect to features of the disclosure indicates that examples can contain any combination of the listed features, as is appropriate given the context.

Phrases and parentheticals beginning with "e.g." or "i.e." are used to provide examples merely for the purpose of clarity. It is not intended that the disclosure be limited by the examples provided in these phrases and parentheticals. The scope and understanding of this disclosure may include certain examples that are not disclosed in such phrases and parentheticals.

The invention claimed is:

1. A network manager, comprising processing circuitry and a memory including instructions that, when executed by the processing circuitry, cause the network manager to:
   receive, from a conductor switch of a switch stack, an active configuration;
   determine, based on the active configuration, switch model types for a plurality of switches of the switch stack;
   determine, based on the switch model types and the active configuration, a number of ports of the plurality of switches of the switch stack and a current configuration of each port of each switch of the switch stack;
   update a device configuration element of a network management user interface to display the current configuration of each port of each switch of the switch stack in a manner that indicates that the switch stack is a single logical switch, wherein the network management user interface is a web form delivered to a client device that is remote from the network manager; and
   upon the conductor switch experiencing a failure, preserve the device configuration element and replace the conductor switch with a backup conductor switch of the switch stack, wherein replacing the conductor switch with the backup conductor switch comprises migrating the active configuration to the backup conductor switch.

2. The network manager of claim 1, wherein determining a number of ports comprises, for each switch of the plurality of switches, selecting a respective switch configuration file from a switch library and identifying a number of ports for each switch from the respective switch configuration file.

3. The network manager of claim 2, wherein each switch configuration file corresponds to a switch model type of the switch model types.

4. The network manager of claim 1, wherein updating the device configuration element comprises transmitting structured data to the network management user interface using a REST API.

5. The network manager of claim 4, wherein the structured data is Javascript Object Notation (JSON) formatted data indicating a single logical switch corresponding to the switch stack.

6. The network manager of claim 4, wherein the structured data represents a schema that provides configurable parameters for the switch stack and constrains and validates inputs into the network management user interface.

7. The network manager of claim 1, wherein the memory includes instructions that cause the network manager to detect the failure by comparing an identifier of the backup conductor switch to a backup conductor identifier in the active configuration.

8. A system, comprising:
   a plurality of switches configured as a switch stack, wherein a first switch of the plurality of switches is a conductor switch of the switch stack; and
   a network manager configured to:
      receive, from the conductor switch of the switch stack, an active configuration;
      determine, based on the active configuration, switch model types for the plurality of switches of the switch stack;
      determine, based on the switch model types and the active configuration, a number of ports of the plurality of switches of the switch stack and a current configuration of each port of each switch of the switch stack;
      update a device configuration element of a network management user interface to display the current configuration of each port of each switch of the switch stack in a manner that indicates that the switch stack is a single logical switch, wherein the network management user interface is a web form delivered to a client device that is remote from the network manager; and
      upon the conductor switch experiencing a failure, preserve the device configuration element and replace the conductor switch with a backup conductor switch of the switch stack, wherein replacing the conductor switch with the backup conductor switch comprises migrating the active configuration to the backup conductor switch.

9. The system of claim 8, wherein determining a number of ports comprises, for each switch of the plurality of switches, selecting a respective switch configuration file from a switch library and identifying a number of ports for each switch from the respective switch configuration file.

10. The system of claim 9, wherein each switch configuration file corresponds to a switch model type of the switch model types.

11. The system of claim 8, wherein updating the device configuration element comprises transmitting structured data to the network management user interface using a REST API.

12. The system of claim 11, wherein the structured data is Javascript Object Notation (JSON) formatted data indicating a single logical switch corresponding to the switch stack.

13. The system of claim 11, wherein the structured data represents a schema that provides configurable parameters for the switch stack and constrains and validates inputs into the network management user interface.

14. The system of claim 8, wherein the network manager is configured to detect the failure by comparing an identifier of the backup conductor switch to a backup conductor identifier in the active configuration.

15. A method, comprising:
- receiving, by a network manager, from a network management user interface, a configuration for an additional switch of a switch stack, wherein the network management user interface is a web form delivered to a client device that is remote from the network manager;
- receiving, by the network manager, from a conductor switch of the switch stack, an active configuration;
- determining, by the network manager, based on the active configuration, switch model types for a plurality of switches of the switch stack, including a switch model type of the additional switch;
- determining, by the network manager, based on the switch model types and the active configuration, a number of ports of the plurality of switches of the switch stack, including a number of ports of the additional switch, and a current configuration of each port of each switch of the switch stack;
- updating, by the network manager, a device configuration element of the network management user interface to display the current configuration of each port of each switch of the switch stack in a manner that indicates that the switch stack is a single logical switch; and
- upon the conductor switch experiencing a failure, preserving the device configuration element and replacing the conductor switch with a backup conductor switch of the switch stack, wherein replacing the conductor switch with the backup conductor switch comprises migrating the active configuration to the backup conductor switch.

16. The method of claim 15, wherein determining a number of ports comprises, for each switch of the plurality of switches, selecting a respective switch configuration file from a switch library and identifying a number of ports for each switch from the respective switch configuration file, wherein each switch configuration file corresponds to a switch model type of the switch model types.

17. The method of claim 15, wherein updating the device configuration element comprises transmitting structured data to the network management user interface using a REST API.

18. The method of claim 17, wherein the structured data is Javascript Object Notation (JSON) formatted data indicating a single logical switch corresponding to the switch stack.

19. The method of claim 17, wherein the structured data represents a schema that provides configurable parameters for the switch stack and constrains and validates inputs into the network management user interface.

20. The method of claim 17, further comprising:
- detecting the failure by comparing an identifier of the backup conductor switch to a backup conductor identifier in the active configuration.

* * * * *